No. 637,059. Patented Nov. 14, 1899.
C. E. YETMAN.
COMBINED TYPE WRITER AND TELEGRAPHIC TRANSMITTER.
(Application filed Jan. 20, 1898.)
(No Model.) 6 Sheets—Sheet 1.
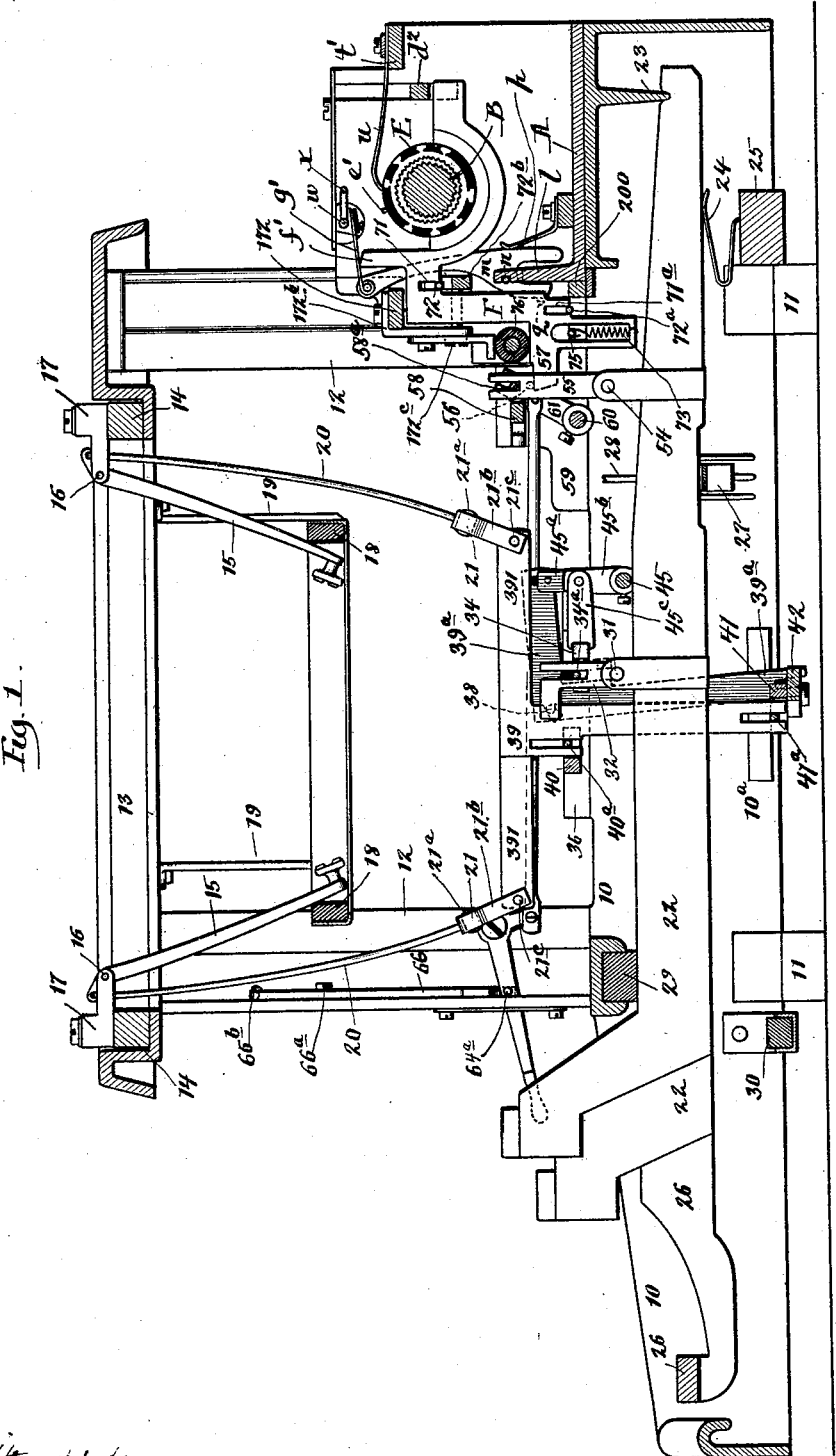
Fig. 1.
Witnesses:
Fred Gerlach
Oliver Collins Dennis.
Inventor
Charles E. Yetman
By 
Attorneys.

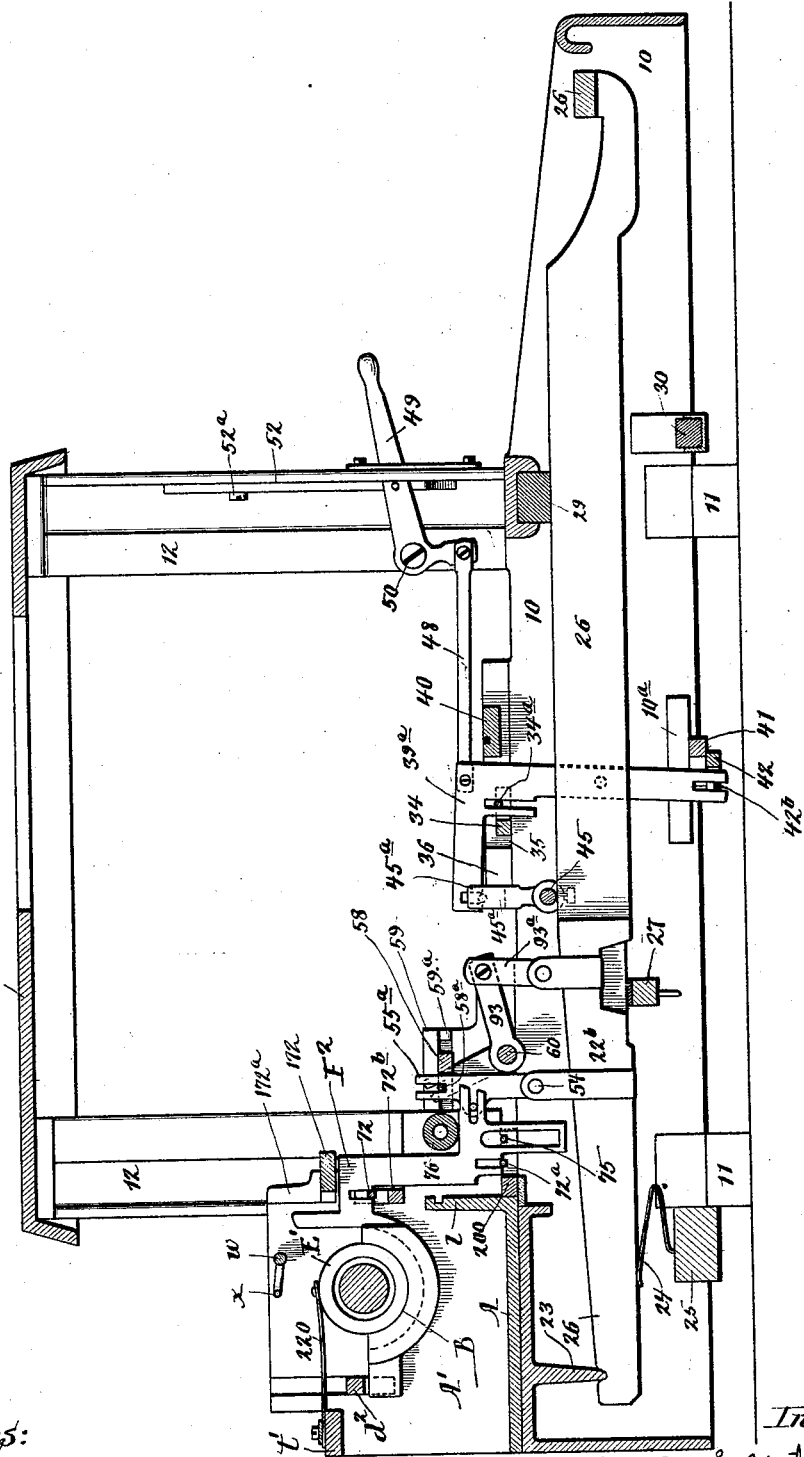

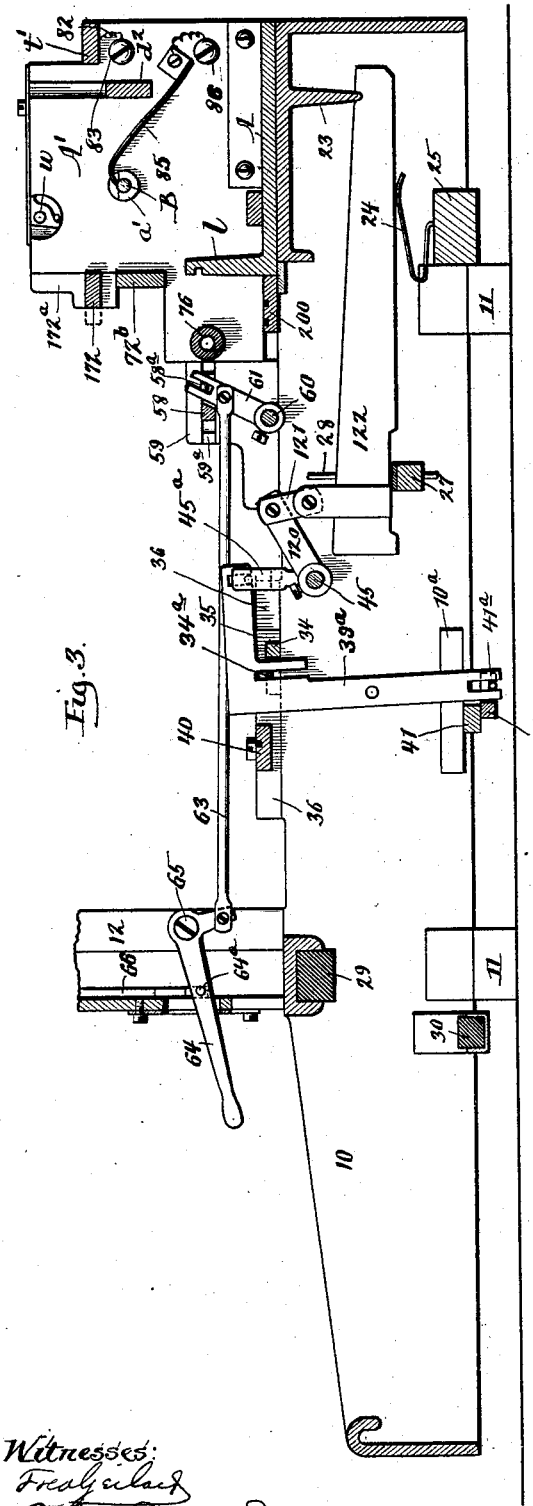

No. 637,059. Patented Nov. 14, 1899.
C. E. YETMAN.
COMBINED TYPE WRITER AND TELEGRAPHIC TRANSMITTER.
(Application filed Jan. 20, 1898.)
(No Model.) 6 Sheets—Sheet 4.
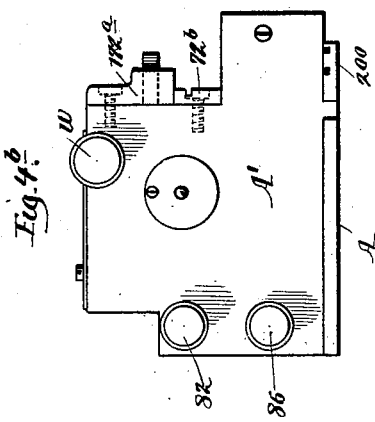
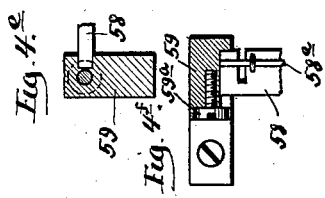
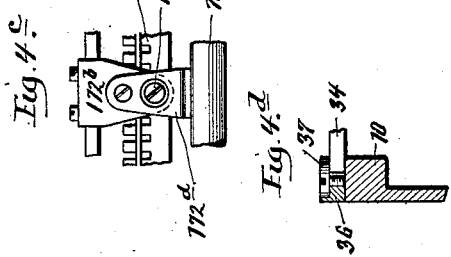
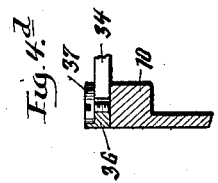
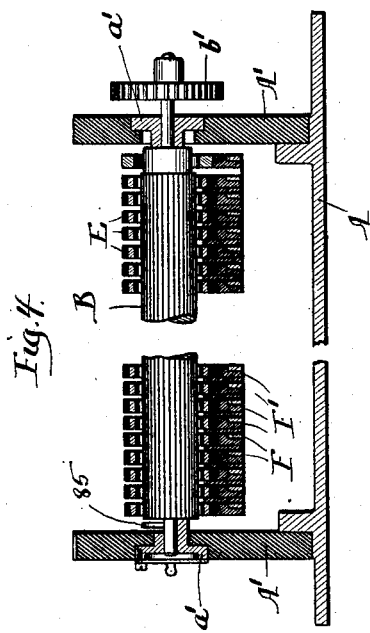
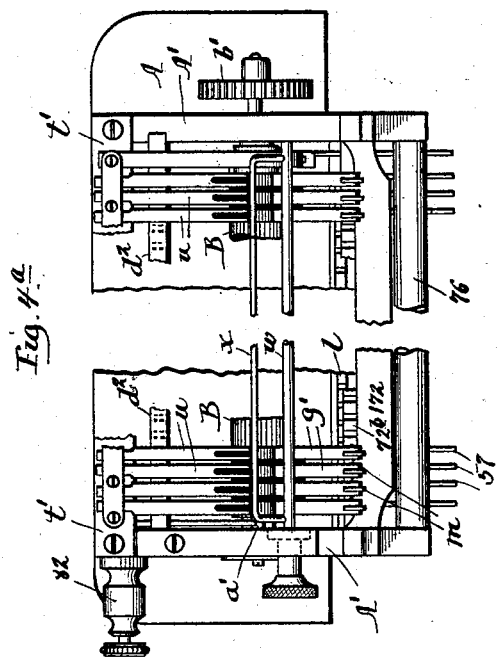
Witnesses:
Inventor:
Charles E. Yetman
By his Attorneys

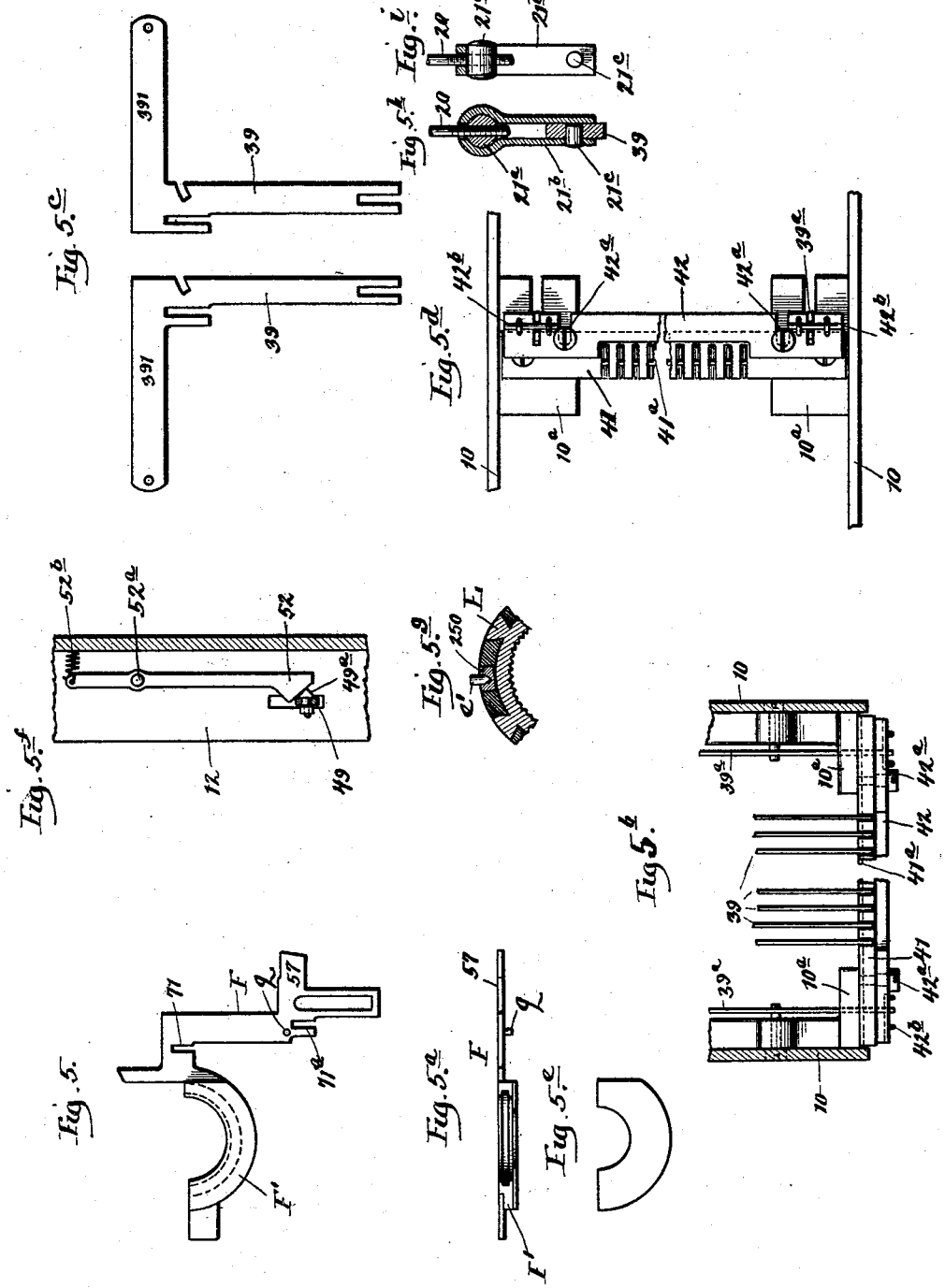

No. 637,059. Patented Nov. 14, 1899.
C. E. YETMAN.
COMBINED TYPE WRITER AND TELEGRAPHIC TRANSMITTER.
(Application filed Jan. 20, 1898.)
(No Model.) 6 Sheets—Sheet 6.
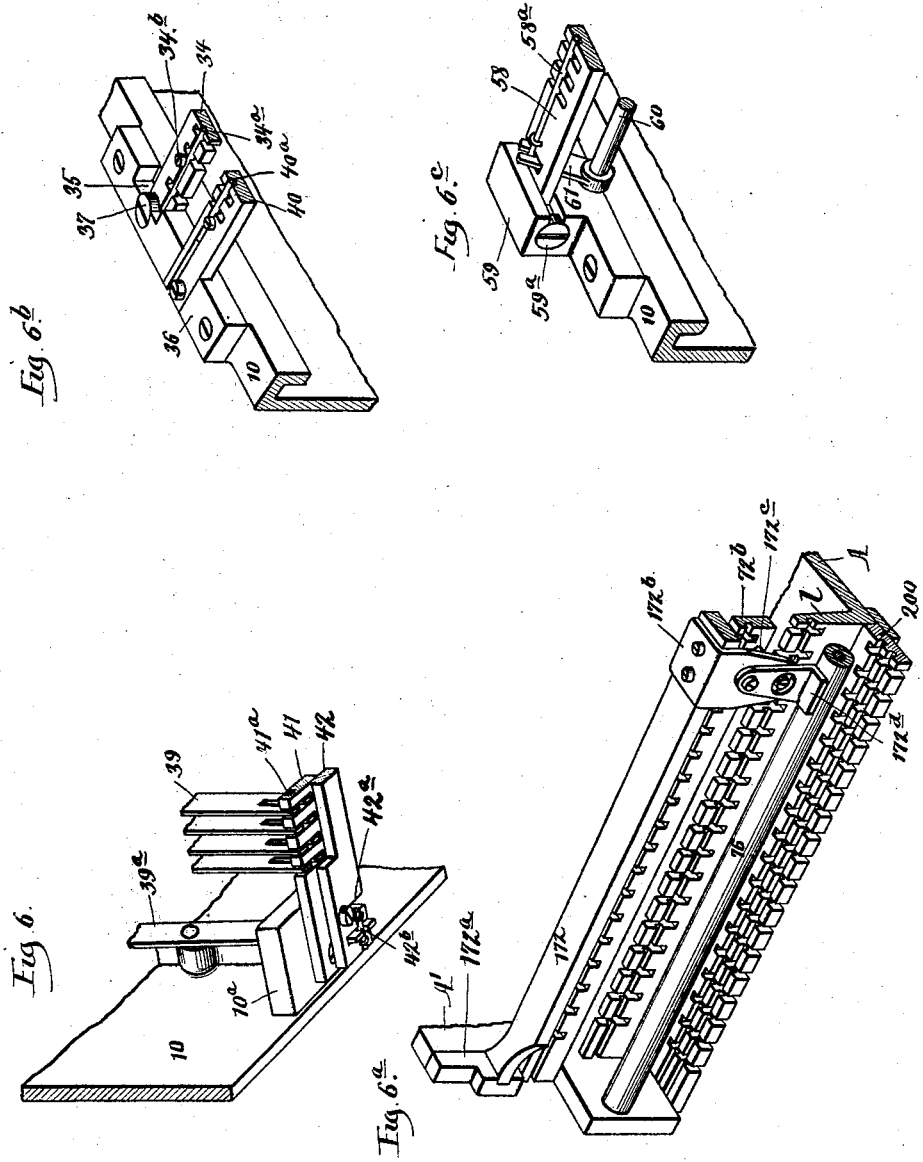

UNITED STATES PATENT OFFICE.

CHARLES ELMER YETMAN, OF OAK PARK, ILLINOIS, ASSIGNOR TO THE WORLD FLASH COMPANY, OF CHICAGO, ILLINOIS.

COMBINED TYPE-WRITER AND TELEGRAPHIC TRANSMITTER.

SPECIFICATION forming part of Letters Patent No. 637,059, dated November 14, 1899.

Application filed January 20, 1898. Serial No. 667,272. (No model.)

*To all whom it may concern:*

Be it known that I, CHARLES ELMER YETMAN, of Oak Park, Cook county, Illinois, have invented certain new and useful Improvements in a Combined Type-Writer and Telegraphic Transmitter, of which the following is hereby declared to be a full, clear, and exact description.

The invention designs to simplify and improve the machine shown by my former Letters Patent, No. 565,128, dated August 4, 1896, the chief object being to reorganize various features of structure, more especially with reference to a readier assemblage of the parts in course of manufacture and thereafter for easier access in effecting quick adjustment or repair, as may be needed.

On the drawings which accompany this specification like parts bear like designation throughout.

Figure 1 is a view of the machine in central longitudinal section; Fig. 2, a similar section on the right, and Fig. 3 a similar section on the left at the inside of the main frame; Fig. $3^a$, a plan view of the parts shown at Fig. 3, but with the trip-lever and overlying adjuncts omitted for clearness; Fig. 4, a longitudinal section view at the ends of the rotating transmitter-shaft, with the switch-rings and the shifters in place; Fig. $4^a$, a top plan view of the transmitter ends; Fig. $4^b$, an end elevation view at the left side of the transmitter; Fig. $4^c$, a detail of a medium brace at the transmitter front; Figs. $4^d$, $4^e$, and $4^f$, details of the mount for the end of the sliding throw-off, the throw-off serving to control the finger-key connections in their engagement with the heels of the switch-shifters at the transmitter; Fig. 5, a side elevation, and Fig. $5^a$ an edge plan view, of a switch-shifter; Fig. $5^b$, a sectional elevation view at the sides of the main frame in front of the upright reciprocating jacks to show the lower guide-bar and the safety-plate for said jacks; Fig. $5^c$, elevation views of front and rear companion jacks detached; Fig. $5^d$, an under plan view of the parts shown at Fig. $5^b$; Fig. $5^e$, an elevation view of insulation-strip fastened at side of switch-shifter, Fig. $5^a$, to separate adjacent circuit-rings; Fig. $5^f$, an elevation view of lock-dog at inside of front upright standard to engage with the bell-crank lever controlling rock-jacks $39^a$; Fig. $5^g$, a detail section of a part of circuit-ring, displaying space-pin mounted in rawhide-plug insulation; Figs. $5^h$ and $5^i$, sectional details of swivel-snap at junction of type-bar links with the upright jacks; Fig. 6, a perspective view at lower inside of main frame, showing upright jack-terminals, comb-bar, safety-plate, and rock-jacks to move said plate; Fig. $6^a$, a perspective detail at the front of the transmitter, with the upright circuit-shifters, the latches, and adjuncts removed; Fig. $6^b$, a perspective detail at the inner upper edge of the base-frame, exhibiting the mount for the comb-bars of trippers and upright jacks, respectively; Fig. $6^c$, a similar view toward the rear of said base-frame, displaying the mount for the sliding throw-off which moves the switch-shifter connectors into and out of action.

As shown in my prior patent, the skeleton base-frame 10, of rectangular form, rests upon the operator's table at the india-rubber plug-feet 11. Upright standards 12 extend at opposite corners from the base and sustain the top plate or deck 13, across which travels the carriage (not shown) for the familiar cylindrical platen. A ring 14 in the depressed seat of top plate 13 affords a mount for the several type-bars 15, set in circular range about the same and pivoted, as at 16, to the separate lugs 17 therefor. Rest-pad 18 for the type-bars is carried, as usual, by pendants 19 from deck 13, while links 20, jointed freely to the separate type-bars 15 back of pivots 16, extend thence below and are united by knuckle-joint 21 to the key-action. The individual keys 22 are here shown of familiar lever form arranged in regular series across the front of the machine in parallel relation and extending back to the fulcrum-ledge 23 on base-frame 10. Springs 24, located between the several keys 22 and a cross-piece 25 of the base, maintain the levers normally in uplifted position. The U-like spacer 26, Fig. 2, incloses the bank of keys in ordinary fashion and like them fulcrums at its opposite legs upon ledge 23 to actuate the universal bar 27. Said bar 27 extends across the machine beneath the spacer 26 and by arms 28 is joined to the customary feed-escapement (not shown) for the carriage. Buffers 29 30, arranged across the width of the machine near the front above and below levers 22 26, ease the shock when said levers are struck and then released. As thus far detailed, the features of the device are common to various sorts of type-writers now in customary use.

According to my prior invention the type-bar links 20 were not united directly with the finger-keys, as in usual practice, but instead there was interposed between the parts named a supplemental structure by means of which the type-bars could be thrown into or out of play at will. This feature enabled the single set of finger-keys to actuate both the type-writer and the electric transmitter in unison, or else to actuate the transmitter separately, and is still retained in the present improvement, although the parts of structure are modified and reorganized in measure for ease of assemblage and for readiness of access thereafter.

Pivoted, as at 31, near the mid-length of the several finger-keys 22, is the parallel set of trippers 32, slotted, as shown, to engage above with the transverse rod $34^a$ on a pilot-bar 34. Referring to Figs. $3^a$ and $6^b$, it is seen that the ends of said bar 34 can slide slightly on the rabbeted seats 35, formed in opposite brackets 36, fastened at the sides of base-frame 10. Screws 37, carried by the brackets 36, overlap the rabbets to hold the bar 34 in place. Rod $34^a$ extends across the teeth of the comb-like pilot-bar 34 and is retained in position by pinch-screws $34^b$ or other expedient. On shift of the pilot-bar 34 the trippers 32 turn to the front or rear about their pivots 31 at the finger-keys.

Each tripper 32, by a side pin 38 thereon, engages at will with a companion notch (see Figs. 1 and $5^c$) formed in the adjacent edge of the series of upright jacks 39. The jacks 39 are mounted in parallel at the front of the trippers 32; but alternate jacks have front and rear extensions 391, to which are attached the swivel-joints 21 for the links 20 of the several type-bars. The swivel-joint comprises a stud $21^a$, through which is threaded (see Figs. $5^h$ and $5^i$) the lower terminal of link 20. Said stud seats loosely within the bight of an elastic snap $21^b$, strung on link 20 and at its free end carrying a pintle $21^c$ to engage a hole near the outer end of upright jack 39.

The several upright jacks are slotted near the top and at the bottom, as shown, Figs. $5^c$ and 1, the upper slots for the front and for the rear sets of jacks being alined when the jacks are mounted in position, so that a single cross-rod serves as a guide for both sets. The slots permit the jacks to rise and fall slightly in engagement with the upper and the lower guide-bars 40 41. The upper guide 40, carried at its ends on the ledges of opposite brackets 36, is of comb-like form, Figs. $3^a$ and $6^b$, to receive in its notched edge the parallel series of jacks, which are held thereby from lateral sway. Rod $40^a$, seated in a groove across the comb-bar, coacts with the upper slots in the jacks to guide the same snugly in their up-and-down movement, Fig. 1. Lower guide 41, also of comb-like form, is fastened at its ends, Figs. $5^b$, $5^d$, and 6, to lugs $10^a$, projected oppositely from the inner sides of frame 10. Rod $41^a$ seats in a groove cut across the teeth of comb-bar 41 and is retained between the face of said bar and the lugs $10^a$. Rod $41^a$ coacts with the lower slots in the jacks 39, and thus serves in conjunction with upper guide-rod $40^a$ to direct the series of jacks in their operative play.

The guide-rods $40^a$ $41^a$ are manifestly of uniform caliber throughout and when in place snugly receive the jacks 39, which by reason of the open slots therein can be rapidly dropped into position over and upon said rods by an unskilled workman at the assembly-room in the factory. The jacks, with their slots, are evenly cut by machinery, so that the need for extra fitting is avoided. A simple pair of pliers expands the elastic snap $21^b$ at the lower end of type-bar link 20 and enables the snap-pintle $21^c$ to unite with the appropriate jack 39. If it appears that the operative length of link 20 must be varied, then on release of snap $21^b$ a half-turn or further adjustment of its threaded stud $21^a$ can be given and the snap thereupon be connected anew with the jack. The snap-pintle engages the jack as readily from either side, and thus allows for a minor turn of the swivel-joint in finer adaptation for the length of link 20. When the snap is disunited from its jack, the particular jack can be at once lifted out of position from the set for quick access to other parts, for replacement, or like purpose. This selective control over the individual jacks without disturbance of the others is an important incident directly due to the mode of mounting the jacks by their open slots over guide-rods common to the series.

The trippers 32, to actuate the jacks, pivot, as was seen, on the finger-keys and carry side pins 38 to encounter the notches in the jacks. The trippers are cast into or out of engagement with the jacks by shift of the pilot-bar 34, such shift being effected, Fig. 2, through the medium of rock-shaft 45, journaled at the sides of frame 10. Near its ends the shaft 45 has crank-arms $45^a$ fastened thereto, Figs. 2 and $3^a$, which by pin-and-slot joint unite with rock-jacks $39^a$, pivoted at opposite points on the inside of the main frame. Rock-jacks $39^a$ are slotted above to engage rod $34^a$ on the sliding pilot-bar 34, while the jack at the right of the machine is united by pitman 48 to bell-crank lever 49, pivoted, as at 50, to the inner face of front standard 12. The arm of said lever 49 passes through a slot in standard 12 and is guided thereby. A wedge-like nib $49^a$, slightly pivoting, Fig. $5^f$, on the extended arm of lever 49, encounters the corresponding face of dog 52, pivoted above, as at $52^a$, on standard 12 and held in the path of nib 49ª by means of spring 52ᵇ. The dog acts to detain nib 49ª, and in consequence crank-lever 49, rock-shaft 45, pilot-bar 34, and trippers 32, in assigned relation either on or off duty to control the play of the type-bar jacks.

At the mid-length of rock-shaft 45 is a supplemental crank-arm 45ᵇ, Fig. 1, having a bunter 45ᶜ pivoted thereon. Said bunter is notched at its front to receive the rear edge of pilot-bar 34 and on oscillation of shaft 45 aids in sliding said bar and as a brace therefor against tendency to spring. On turning the upper ends of rock-jacks 39ª to the rear, Figs. 2 and 3, the pilot-bar 34 slides backward, Fig. 1, to draw side pins 38 of trippers 32 free from engagement with the notches of type-bar jacks 39. Simultaneously the lower ends of rock-jacks 39ª turn forward and slide the safety-plate 42, Figs. 1 and 6, under the adjacent ends of upright jacks 39 to prevent casual displacement. Safety-plate 42, Figs. 5ᵇ, 5ᵈ, and 6, by screw-and-slot joint 42ª, is sustained from frame-lugs 10ª beneath lower guide-bar 41 and by wire pivots 42ᵇ near the ends of said plate engages with the slotted terminal of rock-jacks 39ª. That part of safety-plate 42 which rides under the set of type-bar jacks 39 is cut away, as shown, Figs. 5ᵈ and 6, at the mid-portion to permit the ready up-and-down play of the jacks when in action.

If the jacks be out of action, the trippers 32 stand disengaged from the jacks, and hence any depression of the finger-keys is then without response at the type-bars. In such relation the finger-keys can still be used to work the electric transmitter.

If it is desired to use the transmitter solely without disturbing the type-writer or its carriage, this can be simply accomplished by the provision shown at Fig. 3. The rock-shaft 45 has a crank-arm 120 united by pivoted link 121 with stub-lever 122. Said lever is set at the end of the row of individual key-levers 22 and like them fulcrums on ledge 23 and has a reaction-spring 24. On shifting the rock-shaft 45 to disengage the series of trippers from their jacks, as already detailed, said rock-shaft, through its arm 120 and link 121, depresses stub-lever 122 until the universal bar 27 is encountered and forced down to its limit. Being thus detained in depressed position, the universal bar 27 is free from the stroke of the several key-levers, and hence these can be used at will in operating the electric transmitter, while the type-writer carriage (the feed of which is controlled from the universal bar) remains at a standstill.

Toward the rear of the machine each key-lever 22 carries pivoted thereto, as at 54, a connector 55, having side pin 56, designed to encounter the heel 57 of a switch appliance or shifter F, extended into the path thereof.

Arranged in parallel sets the several connectors 55 have slotted tops, Fig. 1, to engage with a cross-rod 58ª common to all of them, said rod being fastened to the sliding throw-off 58. Throw-off 58 is notched at its edge, Fig. 6ᶜ, in comb-like form and receives the connectors 55 snugly between the teeth thereof. At its ends throw-off 58 slides in the rabbeted seats of blocks 59, mounted at the sides of base-frame 10. Set-screws 59ª 59ᵇ serve to hold the throw-off in place, as seen at Figs. 4ᵉ, 4ᶠ, and 6ᶜ. Upon the same blocks 59 beneath the sliding throw-off is journaled the rock-shaft 60, Figs. 1, 3, and 4, having crank-arms 61 thereon near opposite ends, said arms being slotted, Fig. 6ᶜ, to engage with cross-rod 58ª of the throw-off, by which expedient the throw-off may be cast to bring pins 56 on connectors 55 into or out of range with the heels of switch-shifters F, set in parallel series on the transmitter.

At the left side of the machine crank-arm 61 on rock-shaft 60, Fig. 3, unites by pitman 63 with bell-crank lever 64, pivoted, as at 65, on the inner face of front standard 12. The arm of said lever 64 passes through a slot in standard 12 and is guided thereby. A wedge-like nib 64ª, slightly pivoted after the manner of like nib at companion lever 49, Fig. 5ᶠ, on the free arm of said lever 64, encounters the reverse face on dog 66, pivoted above, as at 66ª, on standard 12 and held in the path of the nib 64ª by means of spring 66ᵇ. The dog acts to detain nib 66ª and in consequence crank-lever 66, rock-shaft 60, throw-off 58, and connectors 55 in assigned relation either on or off duty to control the play of the switch-shifters. By the means detailed the individual finger-keys 22 are brought into or out of action with the corresponding series of shifters at the electric transmitter.

Although differing in details, as presently described, the electric transmitter here shown is substantially the same in general structure as that disclosed by my prior Letters Patent, No. 565,128.

Upon the top of main frame 10 and received snugly between its rear standards 12 is the base-plate A for the transmitter, which latter is thus free to be attached or detached from the type-writer proper, as desired. Side standards A', of vulcanized fiber or like insulation, are united by lugs with plate A and carry metal bushings $a'$ for the journals of the fluted shaft B. Shaft B extends across the machine and affords a mount for the set of switch appliances such as are requisite to transmit the system of telegraph-signals. At one end, Figs. 4 and 4ª, the shaft B carries pinion $b'$, usually of vulcanized fiber, to engage with the gear-train (not shown) of a suitable motor designed to drive the shaft at uniform speed.

The several upright shifters F coact with the corresponding series of switch-rings E to divert the electric current in sending the requisite code-signals. Irregular in form, as shown, the shifters F are set in parallel range across the machine, and at the rear are received within the notches of a bar $d^2$, held in place by grooves in opposite standards A'.

The feet of the shifters, at the front lower end, pass freely within the notches of a transverse comb-bar 200, secured to said standards A'.

Each shifter has upper and lower slots 71 71ª therein, Fig. 5, which enable it to be slipped upright into place over cross-rods 72 72ª and yet permit a limited vertical play. Upper guide-rod 72 is secured to a comb-bar 72ᵇ, which extends edge up across the machine and fastens at its ends to standards A', Fig. 4ᵇ, the respective shifters being received within the notches of said comb-bar. Lower guide-rod 72ª lies across and attaches to comb-bar 200, Figs. 2 and 6ª.

Spring 73, seated within a slot at the leg of each shifter F, stretches between the shifter and a cross-rod 75 at comb-bar 200, over which the spring is strung. The springs hold the several shifters in normal relation, Fig. 1, snugly against buffer 76, sustained at its ends on standards A', Fig. 4ª. In such relation, by striking the finger-key, stud-pin 56 on connector 55 encounters heel 57 of the adjacent shifter F and slightly depresses said shifter against the stress of spring 73.

At its rear each reciprocating shifter F is rounded in contour to conform to the rim of the circuit-ring E with which it is to engage. The shifter-seat for the ring, Figs. 5ª and 5ᵉ, is of hard-rubber or like insulation, and at the side thereof a supplemental piece F' of vulcanized fiber or equivalent is attached, and being extended somewhat higher than the seat itself serves to prevent contiguous rings E from touching. The separate partitions employed in my prior device for like purpose are thus dispensed with.

Surrounding the driver B and when out of action sustained upon the shifters F is the series of circuit-rings E, fluted across their inner rims to quickly mesh with the parallel flutings along said driver B. At the outer rim the several rings carry insulation-blocks properly spaced for each ring in keeping with the particular signal to be transmitted thereby. Space-pins $e'$ project from the ring-rim between the sets of insulation appropriate to a single signal. These space-pins serve as trips to check the motion of the ring at the insulation-block when the signal is finished.

Under stress of the springs 73 the shifters F generally stand in uplifted position and carry with them the series of circuit-rings, which are thus free from the driver B and do not revolve.

Ranged across the base-plate A near its front is a standard $l$, having notches therein, Figs. 1 and 6ª, to receive the forked ends of the series of latches $m$. There is one latch for each of the shifters. The latches are pivotally set upon a rod $n$, common to all of them, and carried by the standard $l$. Plate-springs $p$ bear upon the several latches below the pivot-rod $n$ and maintain them upright, with the rear fork abutting against the standard. Each shifter F is furnished with a lateral stud $q$, Fig. 1, to engage with the front fork of the adjacent latch. On depressing the shifter its stud $q$ rides along the latch, thus slightly turning said latch about its pivot $n$ and against the stress of spring $p$.

The descent of the shifter causes its arm $f'$ to be withdrawn from beneath the trip-pawl $g'$, which is pivoted to the upper end of the latch $m$. The said pawl drops accordingly against the face of the circuit-ring E and rests in the path of its space-pins $e'$. The descent of the shifter necessarily lowers the circuit-ring E which it controls and brings such ring into engagement with the rotating driver B. At once the circuit-ring begins to revolve and so persists for a distance sufficient to transmit the desired signal.

When the transmitter is in use, the electric circuit can be traced from the battery by binding-post 83 and wire 82, Fig. 3, to the metallic plate $t'$, secured at its ends to the vulcanized-fiber standards A'. The plate $t'$ carries a series of spring contact-pieces $u$, forked at their free front ends and brought to bear lightly upon the several circuit-rings E. When the metal part of the ring E makes contact with the spring-piece $u$ riding thereon, the circuit is closed thereby and may be traced farther from ring E by driver B and its journal, spring-contact 85, and wire to binding-post 86 and thence to the distant station. The successive dots and dashes to complete the signal are produced by variations in length of the metallic parts of the ring having the insulator-blocks between them. The slotted edge of spring-piece $u$ as the piece rests against circuit-ring E may occasionally encounter one of the space-pins $e'$ during the traverse of the ring. By setting pin $e'$ in a plug 250 of rawhide or the like, Fig. 5ᵍ, socketed in the insulation, such chance encounter produces no short circuit and can transmit no false signal. Neither can trip-pawl $g'$ when it meets space-pin $e'$ afford an outlet for the current. Since pin $e'$ is embedded in plug 250, the holes for the pins are quickly drilled even down to the metal of ring E beneath the main insulation-blocks without risk of short circuit. As the signal is finished, the next space-pin $e'$ on the ring E encounters the trip-pawl $g'$ and forces it forward, thereby rocking the latch $m$ on its pivot $n$ until the heel of the said latch withdraws from the stud $q$ on the shifter F. The said shifter is thus free to rise again to its normal position under stress of its spring 73, and in rising it lifts the circuit-ring E out of engagement with the shaft B and arrests its movement, while the arm $f'$ of the said shifter raises the pawl $g'$ clear of the ring. All of the parts are thus restored to the normal state in readiness to allow for transmission of the next character, or, as may be requisite, to repeat the same character over again. To repeat the same signal successively, as in calling a line-station, it is merely necessary to detain the trip-pawl $g'$ in uplifted position clear from the path of the space-pins on circuit-ring E, which can be done by means of a pivot-bar $w$ and its transverse rod $x$, as detailed in my prior patent. On casting the throw-off 58 to withdraw pins 56 of connectors 55 clear from the path of the heels of switch-shifters F the same movement of rock-shaft 60 which thus disunites the transmitter from the finger-key action serves also to arrest the rotation of driver B. For such purpose crank-arm 93 on rock-shaft 60, Fig. 2, connects by link $93^a$ with a stub-lever $22^b$, located at the extreme right of the set of finger-keys and mounted like them in the frame. Connector $55^a$ at the stub-lever engages by its pin with shifter $F^2$, which, being depressed, allows friction-ring E' to drop against a boss near the end of driver B. Spring-piece 220, extended between ring E' and cross-bar $t'$, is sufficiently tense to hold said ring stoutly against the boss, and thus to quickly stop the further motion of driver B.

At the upper front of the transmitter a transverse bar 172 extends, Fig. $6^a$, just over the tops of shifters F and is received at its ends in grooved brackets $172^a$, Figs. 3, $4^a$, and $4^b$, fastened to the edges of side standards A'. A stout hanger $172^b$ is rigidly secured to the bar 172 at its mid-length, Figs. 1 and $4^c$. From this projects backward a screw $172^c$, threaded to the upper comb-bar $72^b$. By such provision said comb-bar is stiffly held and kept alined against any tendency to bow or "spring out of true." A toe-piece $172^d$ depends from hanger $172^b$ and bears upon buffer 76 beneath to hold it from springing.

Obviously the details of structure can be varied according to the mechanic's skill without essential departure from the invention.

Having thus described my invention, what I claim as new, and desire to secure by Letters Patent, is—

1. The combination with the finger-keys and with the series of pivoted trippers extended therefrom, of the sliding pilot-bar common to said trippers, the upright reciprocating jacks interposed between said trippers and the links for the corresponding type-bars, removably united to each and having open slots therein, and the cross-rods engaging such slots to guide the jacks, substantially as described.

2. The combination with the finger-keys and with the corresponding type-bars actuated therefrom, of the series of upright slotted reciprocating jacks interposed between said keys and bars and suitably united to each for coöperative play and the cross-rod engaging the jack-slots and over which the jacks can be freely dropped to assume working position, substantially as described.

3. The combination with the finger-keys and with the corresponding type-bars actuated therefrom, of the upright slotted reciprocating jacks interposed between said keys and bars and suitably united to each for coöperative play, the comb-like bar receiving the respective jacks between the teeth thereof, and the transverse guide-rod extended across the comb-bar and engaging the open slot of the reciprocating jacks, substantially as described.

4. The combination with the finger-keys and with the corresponding type-bars actuated therefrom, of the upright slotted reciprocating jacks interposed between said keys and bars and suitably united to each for coöperative play, the upper and lower comb-like bars receiving the several jacks between the respective teeth thereof, and the transverse guide-rods extended across the two comb-bars and engaging the open slots in the jacks, substantially as described.

5. The combination with the type-bar and its link, of the snap-swivel interposed between the link-terminal and its key-action, said swivel comprising a stud threaded to the link and an elastic snap for housing the stud; the snap being removably attached to the adjacent member of the key-action, substantially as described.

6. The combination with the finger-keys and with the set of trippers pivoting thereon, of the transverse rock-shaft, the rock-jacks at the machine sides connecting with said shaft and the sliding pilot-bar united to said rock-jacks and trippers respectively, substantially as described.

7. The combination with the series of upright slotted reciprocating jacks located between the finger-keys and the type-bars and connected operatively to each, of the upper and lower comb-bars carrying transverse guide-rods to engage the jack-slots, the companion rock-jacks pivoted at the machine sides and the sliding safety-bar actuated thereby beneath the ends of the upright jacks to dog the descent thereof, substantially as described.

8. The combination with the finger-keys and with the corresponding set of circuit-rings controlled thereby, of the upright, slotted reciprocating shifters interposed between said keys and bars and in coöperative union with each, the comb-like bar receiving the respective shifters between the teeth thereof and the guide-rod extended across the comb-bar and over which said shifters can be freely dropped at their open slots to assume working position, substantially as described.

9. The combination with the rotating driver and with the series of circuit-rings mounted thereon of the corresponding reciprocating shifters having rounded insulation-seats to engage the respective rings and supplemental insulation-wings to space adjacent circuit-rings apart, substantially as described.

CHARLES ELMER YETMAN.

Witnesses:
FRED GERLACH,
ALBERTA ADAMICK.